(12) United States Patent
Brodie et al.

(10) Patent No.: US 11,293,234 B2
(45) Date of Patent: Apr. 5, 2022

(54) PROTECTIVE DEVICE FOR A MALE END PORTION OF A STEEL TUBE INTENDED FOR USE IN A TUBULAR HYDROCARBON WORKING STRING

(71) Applicant: VALLOUREC OIL AND GAS FRANCE, Aulnoye-Aymeries (FR)

(72) Inventors: Alastair John Brodie, Boulogne-Billancourt (FR); Alexis Van Wesemael, Boulogne-Billancourt (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 17/281,708

(22) PCT Filed: Oct. 1, 2019

(86) PCT No.: PCT/EP2019/076655
§ 371 (c)(1),
(2) Date: Mar. 31, 2021

(87) PCT Pub. No.: WO2020/070165
PCT Pub. Date: Apr. 9, 2020

(65) Prior Publication Data
US 2021/0310318 A1 Oct. 7, 2021

(30) Foreign Application Priority Data

Oct. 2, 2018 (EP) ..................................... 18198314

(51) Int. Cl.
*F16L 57/00* (2006.01)
*E21B 17/10* (2006.01)
*F16L 57/06* (2006.01)

(52) U.S. Cl.
CPC ........ *E21B 17/1085* (2013.01); *F16L 57/005* (2013.01); *F16L 57/06* (2013.01)

(58) Field of Classification Search
CPC ....... F16L 57/005; B65D 59/06; B65D 59/02; Y10S 411/908; E21B 19/24; E21B 17/006
(Continued)

(56) References Cited

U.S. PATENT DOCUMENTS 3,445,144 A * 5/1969 McBrien ............... E21B 17/105
175/325.7
3,576,062 A * 4/1971 Matherne ................ E21B 19/16
29/281.6

(Continued)

FOREIGN PATENT DOCUMENTS

CA 2074132 A1 1/1993

OTHER PUBLICATIONS

International Search Report dated Nov. 25, 2019 in PCT/EP2019/076655 filed on Oct. 1, 2019.

*Primary Examiner* — Patrick F Brinson
(74) *Attorney, Agent, or Firm* — Oblon, McClelland, Maier & Neustadt, L.L.P.

(57) ABSTRACT

Protective device for a male end portion of a steel tube for use in a tubular hydrocarbon working string, the device including a cylindrical sleeve body having a main axis and defining an inner cavity intended to receive the male end portion, an engagement portion having the cylindrical sleeve body is split axially in at least two shells being held together by a junction, and the engagement portion is so configured to separate the at least two shells under exertion of a predefined axial force on a first or second engagement surface.

15 Claims, 3 Drawing Sheets

(58) Field of Classification Search
USPC ......... 138/89, 96 T, 156; 411/424, 432, 908; 166/85.5, 77.51, 378; 285/27
See application file for complete search history.

(56) References Cited

U.S. PATENT DOCUMENTS

| | | | |
|---|---|---|---|
| 4,487,228 A | | 12/1984 | Waldo et al. |
| 4,582,090 A | | 4/1986 | Chase et al. |
| 5,850,854 A | * | 12/1998 | Carroll .................. F16L 55/115 138/96 R |
| 7,237,607 B2 | * | 7/2007 | Angman ................ E21B 19/24 166/85.5 |
| 7,490,677 B2 | * | 2/2009 | Buytaert ................ E21B 19/24 166/380 |

\* cited by examiner

PROTECTIVE DEVICE FOR A MALE END PORTION OF A STEEL TUBE INTENDED FOR USE IN A TUBULAR HYDROCARBON WORKING STRING

The present invention relates to a protective device for a pin end portion of a steel tube intended for use in a tubular hydrocarbon working string, and to a steel tube equipped with such a protective device.

A tubular hydrocarbon working string generally consists of a plurality of tubes attached one by one. More specifically, a tubular hydrocarbon working string for hydrocarbon wells or similar wells generally includes a tubing string and several casing strings. The tubing string consists of a plurality of completion tubes accommodated inside the casing string. The casing string consists of a plurality of casing tubes arranged inside the drilling hole of the well. The casing tubes have a larger diameter cross-section than the completion tubes and surround the completion tubes. In the lower part of the casing string, the casing tubes are also called liner tubes.

Two tubes of a string may be attached by threaded joint. A typical threaded joint for connecting a first tube to a second tube may include a male threaded portion formed on the outer peripheral surface of the first tube, also designed as a pin end, and a female threaded portion formed on the inner peripheral surface of the second tube. The threaded portions cooperate so as to attach the first tube to the second tube, thus forming a threaded joint.

Another known type of threaded joint may include a coupling box for attaching a first tube and a second tube. Each tube includes a pipe having, at both ends thereof, a male threaded portion formed on the outer peripheral surface. The first tube includes a coupling box having an inner hole with a female threaded portion formed on the inner periphery of the hole. The coupling box is previously connected to one end of the steel pipe by means of the male threaded portion of said end and the female threaded portion of the coupling box. By way of this arrangement, the first tube has a male threaded portion also designed as a pin end and a coupling box portion with a female threaded portion. The second tube may be attached to the first tube in order to form a working string.

The solidity of a string of tubes generally relies on the absence of wear on the parts or portions forming the threaded joint. It has therefore been proposed devices for protecting the threaded portions of tubes having a male threaded portion and a female threaded portion.

For operations on site, it is necessary to remove the device prior to installing the tube in a well. It is preferable to remove the device at the latest stages prior to installing the tube in the well. The protectors then have to be unscrewed from the tube. These operations can be time consuming and are demanding attention from operators who also have to manage tubes. The installation process of the working string is thus rendered more complicated by the use of such a device and the weak points of a tube are not protected during installation of the working string.

One aim of the present invention is to overcome the aforementioned drawbacks.

It is a particular object of the invention to improve the operations on site, particularly the easiness and speed of operations involving handling of protectors while having the possibility to remove protectors at the latest stages prior to installing the tube in the well.

Incidentally the invention improves stabbing operations making alignment of ends of tubes easier.

According to one aspect, the invention is a protective device 1 for a male end portion 20 of a steel tube 10 intended for use in a tubular hydrocarbon working string, the device 1 including a cylindrical sleeve body 2 having a main axis X and defining an inner cavity 5 intended to receive the male end portion 20, an engagement portion 3 characterized in that the cylindrical sleeve body 2 is split axially in at least two shells 7, 8 being held together by a junction 4 and the engagement portion 3 is so configured to separate the at least two shells 7, 8 under exertion of a predefined axial force on a first or second engagement surface 9b, 9h.

According to one aspect, the engagement portion 3 is split in at least two parts, each part of engagement portion being attached to one corresponding shell, and the engagement portion 3 forming a first engagement surface 9b 9h being an inclined surface of revolution about the axis X. A force exerted by a second pipe on said engagement surface 9b push away shells one from the other.

According to one aspect, the first engagement surface 9b, 9h is a portion of a conic surface 63, 64 of axis X, with an angle of the cone between 60° and 120°, so as to transmit and convert an axial force in a radial force efficiently separating the shells.

According to another aspect wherein the first engagement surface 9b is a portion of a conic surface 63, 64 of axis X, with an angle of the cone between 120° and 170°.

According to one aspect, the first engagement surface 9b is on the side opposite of the cylindrical sleeve body to transmit a force exerted by a second tube.

According to one aspect, the first engagement portion 3 comprises a second engagement surface (9h) located on the side of cylindrical sleeve body in order transmit a force exerted by the first tube on which the protective device is mounted.

The engagement portion 3 may comprise a second inner cavity 16 in extension of the first inner cavity. The protective device may comprise a removable cap 17 to close the second inner cavity 16.

According to another aspect, the cylindrical sleeve body 2 may be split axially in two half shells 7, 8, said two half shells having bevelled seams 21 and the engagement surface 6 comprising two slits formed by said bevelled seams 21. The protective deice is compact but necessitates angular alignment with the second tube or the female end protector of the second tube.

According to one aspect, the junction may comprise hooks 71. Said hooks 71 are located in edges of first walls of shells and are interlocking with corresponding grooves 72 in the edges of second walls of the shells.

The shells may be plastic moulded and the junction may be a wall thinner than the walls of the shells and so configured to break under a predefined radial load corresponding to said predefined axial load.

Alternatively or complementarily the junction may be made of glue, or plastic soldering between walls of shells. The shells may comprise hollow holes on two adjacent walls of two shells and the junction comprises a tie-wrap going through and wrapped around said hollow holes.

According to one aspect, the first cylindrical sleeve body 2 comprises threads 12 on an inner surface.

The invention is also about an ensemble of a protective device according to any embodiment disclosed therein and a protective device for female end portion 21 of a steel tube 10 intended for use in a tubular hydrocarbon working string characterized in that the protective device for female end portion 21 comprises an activating surface 22 so configured to contact the engagement portion 3 and to exert a force exceeding a predefined threshold so that the shells are separated one from the other.

The invention is also about use of a protective device with the steps of:
having said protective device mounted on a male end of a first pipe
lowering said first pipe with said protective device in close proximity to a second pipe 23 so that said protective device contacts said second pipe through the engagement portion 3 and causing the half shells 7,8 to separate under force exerted by said second pipe 23 or first pipe 10 on said engagement portion 3.

According to one aspect, the second pipe 23 may be equipped with a female end protecting device 21 and in which the female protector contacts the engagement portion 3 of the protective device 1, causing the shells 7, 8 to separate under force exerted by said female end protecting device or first pipe on said engagement portion 3.

The present invention and its advantages will be better understood by studying the detailed description of a specific embodiment given by way of non-limiting examples and illustrated by the appended drawings on which:

Figure 1:
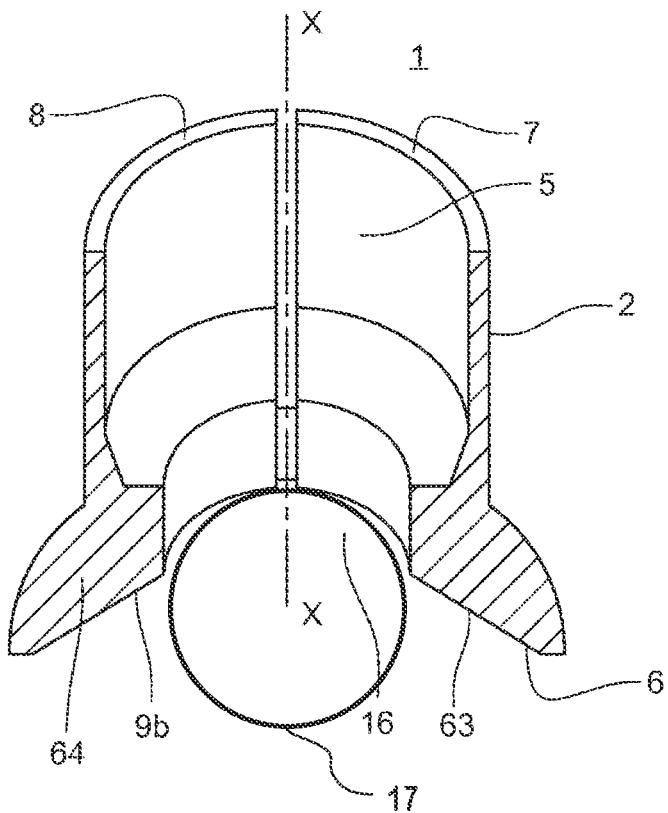
FIG. 1 is a perspective cut view of a protective device according to one aspect of the invention.
Figure 4:
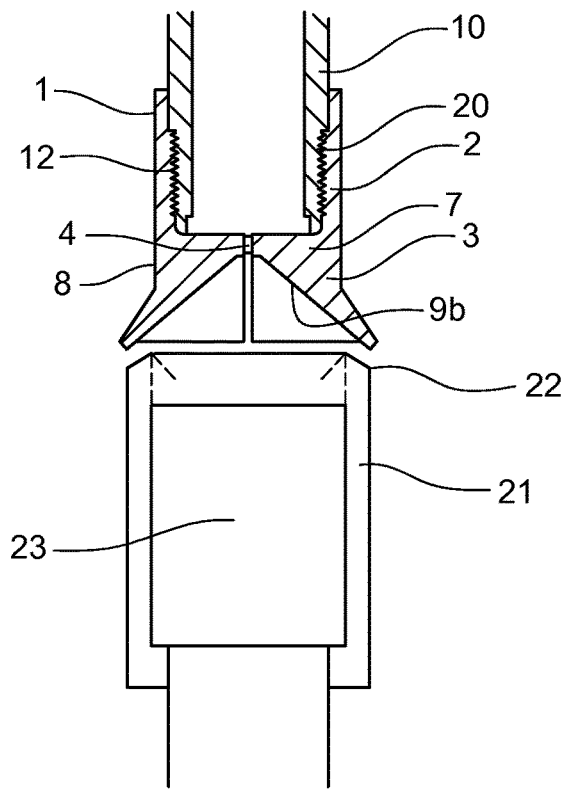
FIG. 4 is a cut view of a protective device according to a first aspect of the invention and an ensemble with tubes according to one aspect of the invention.

With reference to FIGS. 1 and 4, it is schematically depicted a protective device 1. The device 1 aims at protecting an end portion of a first steel tube or first pipe 10, particularly a completion steel tube 10. Such tubes have functional surfaces such as, seals, needing a protection during storage, transportation, handling.

The protective device 1 and the tube 10 are globally axisymmetric with respect to an axis X.

Unless contrary indication, the words "axial", "axially", "radial", "radially" will be understood as referring relative to the vertical axis of symmetry of the device 1, that is to the direction of axis X.

The first pipe 10 has a substantially cylindrical shape about the axis X. The first pipe 10 has a circular horizontal cross section. The first pipe 10 includes a male threaded portion 11 on the outer periphery of its lower end. In a similar manner, the second pipe 23 has a substantially cylindrical shape about the axis X. The second pipe 23 has a circular horizontal cross section. The second pipe 23 includes a female threaded portion 13 on the inner periphery of its upper end.

The protective device 1 forms a sleeve body 2 having a substantially cylindrical shape about the axis X defining an inner cavity 5. The sleeve body 2 has on one side an entry for introduction of the first pipe 10 in said inner cavity 5. Said sleeve body 2 may have a female threaded portion 14 formed on the inner surface of the sleeve body 2 and adapted to cooperate with the male threaded portion 11 of the first pipe 10, so that the protective device can be mounted by screwing onto the first pipe 10.

The sleeve body 2 of FIG. 1 comprises two half shells 7 and 8. Said two half shells are held together by a junction portion 4. For simplicity of figures and for a better understanding, the protecting device of the invention or represented with two half shells. A protective device according to the invention may have more than two shells, particularly a protective device may also have three or four shells.

The protectors may be in plastic. The plastic elements may be reinforced with metal inserts. The protector may be moulded. The junction 4 may be a thin wall connecting the adjacent edges of the main walls of the shells. The thickness of the thin wall are calculated based on a breaking strength suited for the purpose of the use of the protecting device and the diameter of the pipe to protect so as to necessitate a predefined force to break under stress. When the cylindrical sleeve body is split into two shells, there may be two junctions, when the cylindrical sleeve body is split into three shells, there may be three junctions, when the cylindrical sleeve body is split into four shells there may be four junctions.

A junction 4 may also be formed by a deposit of glue between the edges of the main walls of the shells. This solution is adapted to a second use of the protecting device. Alternatively, the junction may be realised with plastic soldering.

Figure 6:
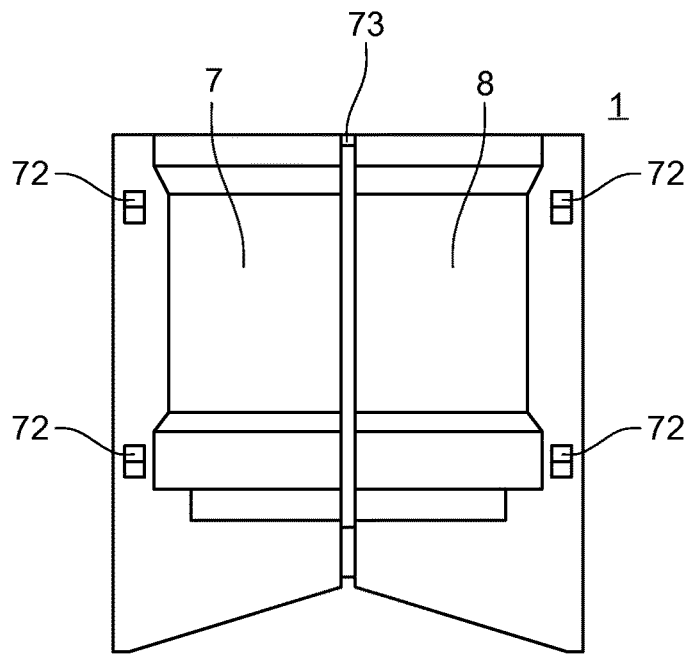
FIG. 6 is a cut view of protective device according to another aspect of the invention.

As depicted in FIG. 6, a junction may be hooks 71 located on the first edge of a first shell that interlock with grooves 72 located on a second edge of a second shell.

The protective device 1 of FIG. 6 comprises four shells. With a first and second junctions made with hooks 71 and grooves 72, and a third and fourth junction made of thin wall 73 connecting the adjacent edges of the main walls of the shells 7, 8.

A junction may comprise a tie wrap or cable tie, and the shells further comprises a first through hole in a first shell and a second through hole in the second shell, the tie-wrap passing through and wrapped around said first and second holes. The tie-wraps are designed to break under a predefined load, and are easily replaceable for reuse.

As depicted on FIG. 4, the protective device 1 is screwed on the lower end of the first pipe 10. The protective device may further have a seal 15 arranged to cooperate with a surface of the first tube 10 to protect functional surfaces of the end of the first tube 10.

According to a first aspect of the invention, the protective device 1 has an engagement portion 3 located at the end of the sleeve body which is opposite to the entry for the tube 10. The engagement portion 3 may act as a bumper to sustain impacts that can occur during transportation or handling of a tube equipped with the protective device 1. The engagement portion 3 of FIG. 1 is configured to separate the shells one from the other under a predefined axial force. This axial force can be exerted by the first pipe 10 itself, the second pipe 23 directly or indirectly by a second protecting device mounted on the upper end of the second pipe 12. This second protecting device may be a female end protecting device 40.

The junction 4 is defined to break under a force exceeding a predefined threshold. There may be two defined thresholds, a first threshold corresponding to an axial force to be exerted on a first or a second engagement surface, and a second threshold corresponding to the radial force to be exerted to break the junction 4.

The engagement portion 3 of FIG. 1 comprises an engagement surface 9b which is a generally an inclined surface of revolution about the axis X. The engagement surface may be a concave surface or a convex surface, but presenting a general inclination so as to be able to convert a part of an axial force in radial force in order to separate the shells of the cylindrical sleeve body 2 one from the other. The engagement surface 9b may be a conic surface. The engagement portion 3 of FIG. 1 is made of two engagement portion parts 63 64. These two parts may be half parts, each one being joined with respective half shell 7, 8. These two engagement portion parts 63 64 may be unequal in size, but each one has to be attached to respective half shells 7, 8. When there is more than two shells composing the cylindrical sleeve body, each shell should be attached to a distinct engagement portion part in order to improve reliability of the separation of the shells, even if there can be more than one engagement portion part per shell.

According to one aspect, the engagement surface 9b of FIG. 1 is a conic surface with a cone angle comprised between 60° and 120°. That means that a generatrix of the cone has an angle between 30° to 60° with respect to axis X. With this configuration, the engagement surface 9b and the engagement portion 3 may extend radially outwardly from an exterior surface of the sleeve body 2, this configuration resulting from an absence of thickening of the walls of the cylindrical sleeve body to gain weight and material on the protector.

Figure 2:
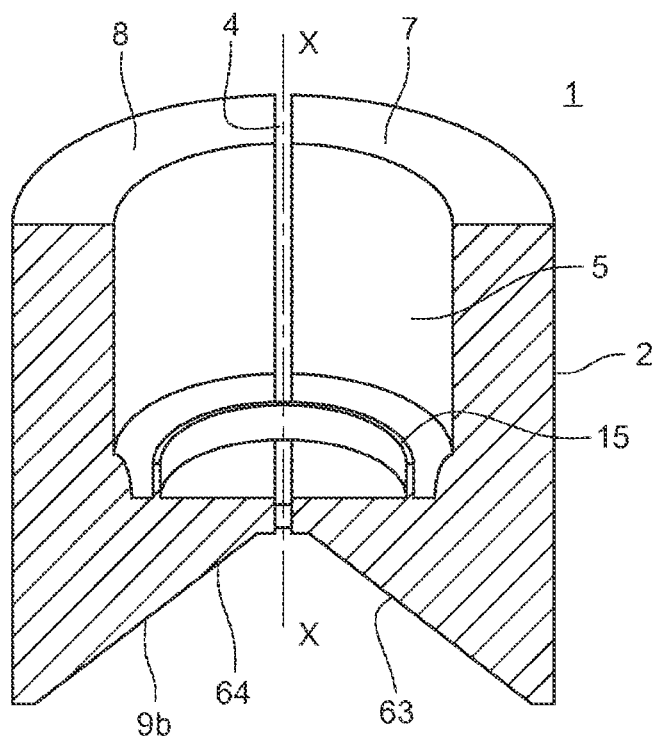
FIG. 2 is a perspective cut view of a protective device according to a second aspect of the invention.

In FIG. 2 the protective device according to a second aspect mainly differs from the protective device of the first aspect by a reduced angle of the conic surface of engagement surface 9b, of 90° for the protecting device of FIG. 2. The bulk of the protective device is bigger axially but it allows a higher conversion of axial force applied to the engagement surface 9b into radial forces separating the two half shells 7, 8.

Figure 3:
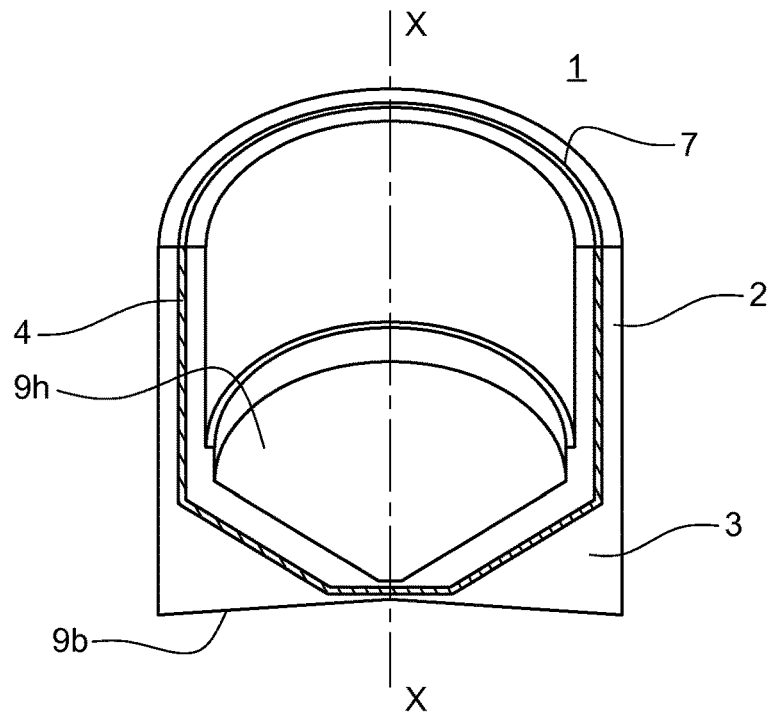
FIG. 3 is a perspective cut view of a protective device according to a third aspect of the invention.

In FIG. 3 the protective device according to a third aspect of invention mainly differs from the protective device of the first aspect by an increased angle of the conic surface of the engagement surface 9b. The angle is comprised between 150° and 175°. The engagement surface 9b is a first engagement surface 9b located on the side of the engagement portion which is opposite the cylindrical sleeve body 2. The protecting device of FIG. 3 comprises a second engagement surface 9h located on the upper side of the engagement portion that is on the side of the cylindrical sleeve body 2. Function of the second engagement surface 9h is to separate the shells of the cylindrical sleeve body 2 under force exerted by the first pipe 10 itself. When the protecting device 10 is blocked by a second pipe 23 during lowering of the ensemble of the first pipe 10 and the protecting device 1, the first pipe 10 by its own weight can exert a pressure on the second engagement surface 9h, which is generally inclined and so configured to separate the shells one from the other. The second engagement surface 9h may be a conical surface, a convex or concave surface, and may have an orientation between 30° and 60° with axis X.

Even if with the second engagement surface 9h located on the upper side of the engagement portion, a first engagement surface is not absolutely necessary, the interest of having a first engagement surface 9b on the lower side of the engagement portion is to contribute to the initiation of the separation of the shells especially to overcome the disturbance of the threads 12 in the separation of the shells.

Also, a protective device according to any of the embodiments may have an interior engagement surface 9h as shown on FIG. 3. This interior engagement surface 9h is so configured to separate the shells under an axial force exerted by the first pipe 10 such as the one exerted under stabbing operations, when the first pipe 10 is brought into alignment with a second pipe of a column of tubes to which the first pipe 10 is to be mounted. The interior engagement surface 9h improves the separating effect on the shells.

The axial force necessary to be applied on the engagement surface 9b, 9h may be applied by a female protector device 21 shown on FIG. 4. The female protector device 21 may have an activating surface 22. Advantageously, the activating surface 22 may be complementary to the engagement surface. For example, the activating surface 22 may be a conic convex surface when the engagement surface is a conic concave surface, and said conic surface may be of an angle substantially equal to the angle of the conic concave angle surface. In this way, the axial forces exerted by the female protective device on the engagement surface is efficiently transmitted.

The activating surface 22 may be located on a steel ring fitted with the end of the second tube 23.

When a first tube 10 is handled on site to be assembled with a second tube 23, it is brought vertically above the second tube 12 and then lowered so that the first connection of the first tube 10 stabs into the second end of the second tube 23. For this stabbing operation, it is necessary that the connections are deprived from their protecting devices. The protective device of the invention associated with a first tube 10 forms an ensemble that doesn't need a lengthy manual operation by operators to remove the protector by unscrewing, and the protector can be removed at the last moment. Therefore, the invention is also about an ensemble of a protective device according to any of the embodiment described therein and a tube.

The invention is also about the use of such a first protective device according to any of the embodiments therein which is in a first state mounted on a first tube 10, then the ensemble of the first tube 10 and the first protective device is lowered for stabbing on a second pipe 23 so that the protective device contacts the second tube 12 or a second protective device mounted on the second tube 12 and causing the shells of the first protective device to separate one from the other under forces exerted by the second tube, or the second protective device, or the first tube on the engagement portion of the first protective device.

An advantage of the protective device according to the invention is that even though it offers the particular feature of quick unmounting on field, it can be manipulated in a classic manner by operators, it can be mounted by screwing, after manufacture of the tube, or after inspection of the tube or the tube end. Operator may have no action on the device at the time of stabbing on field.

Figure 5:
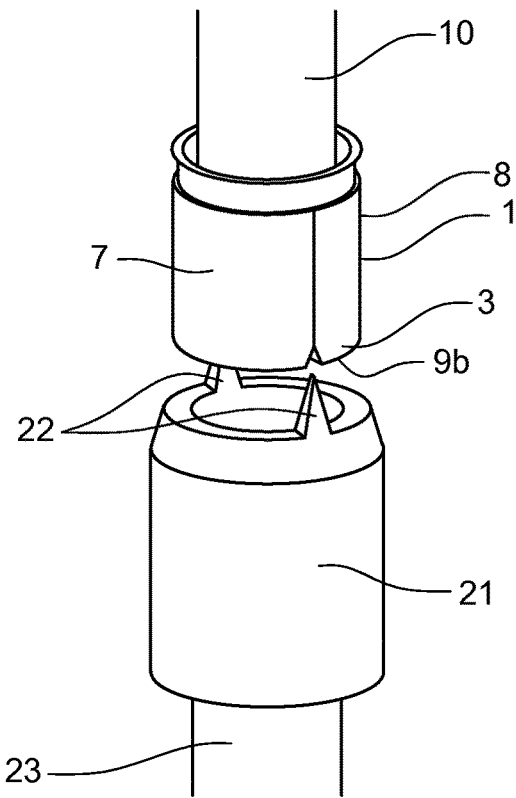
FIG. 5 is a perspective view of a protective device according to a fourth aspect of the invention and an ensemble according to a second aspect of the invention.

A particular embodiment of a protective device on FIG. 5 comprises an engagement portion 3 with an engagement surface 51 split in two parts, the engagement surfaces comprising bevelled seams 52 in the prolongation of the jointing edges of the shells. The bevelled seams 52 are surfaces with an orientation of 30° to 60° with respect to axis X. This advantage of this embodiment is the compactness of the protective device, but it demands an angular alignment of the protective device with an actuator such as an activating surface 54 of a female protecting device 53.

The invention claimed is:

1. A protective device for a male end portion of a steel tube intended for use in a tubular hydrocarbon working string, the protective device comprising:
   a cylindrical sleeve body having a main axis and defining an inner cavity intended to receive the male end portion; and
   an engagement portion,
   wherein the cylindrical sleeve body is split axially in at least two shells being held together by a junction, wherein the engagement portion is configured to separate the at least two shells under exertion of a predefined axial force on a first or second engagement surface,
wherein the engagement portion comprises a second inner cavity in extension of the first inner cavity, and
wherein the protective device comprises a removable cap to close the second inner cavity.

2. The protective device according to claim 1, wherein the engagement portion is split in at least two parts, each part of the engagement portion being attached to one corresponding shell, and the engagement portion forming a first engagement surface being an inclined surface of revolution about the axis.

3. The protective device according to claim 2, wherein the first engagement surface is a portion of a conic surface of the axis, with an angle of the cone between 60° and 120°.

4. The protective device according to claim 2, wherein the first engagement surface is a portion of a conic surface of the axis, with an angle of the cone between 120° and 170°.

5. The protective device according to claim 1, wherein the first engagement surface is on a side opposite of the cylindrical sleeve body.

6. The protective device according to claim 1, wherein the engagement portion comprises a second engagement surface located on a side of the cylindrical sleeve body.

7. The protective device according to claim 1, wherein the cylindrical sleeve body is split axially in two half shells, said two half shells having bevelled seams and the engagement surface comprises two slits formed by said bevelled seams.

8. The protective device according to claim 1, wherein the junction comprises hooks.

9. The protective device according to claim 8 wherein the hooks are located in edges of first walls of shells and are interlocking with corresponding grooves in the edges of second walls of the shells.

10. The protective device according to claim 1, wherein the shells are plastic moulded and the junction is a wall thinner than the walls of the shells and configured to break under a predefined radial load corresponding to said predefined axial load.

11. The protective device according to claim 1, wherein the junction is made of glue, or plastic soldering between walls of shells.

12. The protective device according to claim 1, wherein the first cylindrical sleeve body comprises threads on an inner surface.

13. A system for protecting an end portion of a steel tube, the system comprising:
a protective device for a male end portion of the steel tube intended for use in a tubular hydrocarbon working string, the protective device including a cylindrical sleeve body having a main axis and defining an inner cavity intended to receive the male end portion, and an engagement portion, wherein the cylindrical sleeve body is split axially in at least two shells being held together by a junction, and wherein the engagement portion is so configured to separate the at least two shells under exertion of a predefined axial force on a first or second engagement surface, wherein the engagement portion comprises a second inner cavity in extension of the first inner cavity, and wherein the protective device comprises a removable cap to close the second inner cavity; and
a protective device for female end portion of a steel tube intended for use in a tubular hydrocarbon working string,
wherein the protective device for female end portion includes an activating surface configured to contact the engagement portion and to exert a force exceeding a predefined threshold so that the shells are separated one from the other.

14. A use of a protective device according to claim 1, comprising:
mounting said protective device on a male end of a first pipe; and
lowering said first pipe with said protective device in close proximity to a second pipe so that said protective device contacts said second pipe through the engagement portion and causing the shells to separate under force exerted by said second pipe or first pipe on said engagement portion.

15. The use of a protective device according to claim 14, wherein the second pipe is equipped with a female end protecting device and in which the female protector contacts the engagement portion of the protective device, causing the shells to separate under force exerted by said female end protecting device or first pipe on said engagement portion.

* * * * *